(12) United States Patent
Rebeschi et al.

(10) Patent No.: US 8,493,358 B2
(45) Date of Patent: Jul. 23, 2013

(54) HIGH SPEED LOW POWER MULTI-TOUCH TOUCH DEVICE AND CONTROLLER THEREFOR

(75) Inventors: Thomas J. Rebeschi, Merrimack, NH (US); Craig A. Cordeiro, Westford, MA (US)

(73) Assignee: 3M Innovative Properties Company, St. Paul, MN (US)

( * ) Notice: Subject to any disclaimer, the term of this patent is extended or adjusted under 35 U.S.C. 154(b) by 279 days.

(21) Appl. No.: 13/111,084

(22) Filed: May 19, 2011

(65) Prior Publication Data

US 2011/0291986 A1 Dec. 1, 2011

Related U.S. Application Data

(60) Provisional application No. 61/348,173, filed on May 25, 2010.

(51) Int. Cl.
*G06F 3/044* (2006.01)

(52) U.S. Cl.
USPC ........... 345/174; 345/173; 345/178; 345/179; 178/18.05; 178/18.06; 178/18.07; 324/610; 324/611

(58) Field of Classification Search
USPC ............... 345/173, 174, 178, 179; 178/18.06, 178/18.07, 18.08, 19.01, 19.03, 19.04; 324/610, 324/611
See application file for complete search history.

(56) References Cited

U.S. PATENT DOCUMENTS

| | | | |
|---|---|---|---|
| 3,732,369 | A | 5/1973 | Cotter |
| 4,071,691 | A | 1/1978 | Pepper, Jr. |
| 4,175,239 | A | 11/1979 | Sandler |
| 4,323,829 | A | 4/1982 | Witney et al. |
| 4,581,483 | A | 4/1986 | Ralston |
| 4,639,720 | A | 1/1987 | Rympalski et al. |
| 4,686,332 | A | 8/1987 | Greanias et al. |
| 5,006,952 | A | 4/1991 | Thomas |

(Continued)

FOREIGN PATENT DOCUMENTS

| | | |
|---|---|---|
| EP | 178157 | 4/1986 |
| FR | 2774497 | 8/1999 |

(Continued)

OTHER PUBLICATIONS

Analog Devices AD7142/AD7142-1, Rev PrD, "Programmable Capicatance-to-Digital Converter with Environmental Compensation", 2005 Analog Devices, Inc., pp. 1-64.

(Continued)

*Primary Examiner* — Joseph Haley
*Assistant Examiner* — Linh N Hoffner
(74) *Attorney, Agent, or Firm* — Robert S. Moshrefzadeh

(57) ABSTRACT

A touch-sensitive device includes a touch panel, a drive unit, a sense unit, and a measurement unit. A touch applied to a node of the panel changes a capacitive coupling between two electrodes (a drive electrode and a sense electrode) of the touch panel. The drive unit delivers a drive signal, which may comprise one or more drive pulses, to the drive electrode. The sense unit couples to the sense electrode, and generates a response signal that that is used to accumulate charge in a charge accumulator to provide an accumulated signal. The accumulated signal is responsive to the capacitive coupling between the electrodes, and is measured to provide an indication of a touch at the node.

15 Claims, 4 Drawing Sheets

U.S. PATENT DOCUMENTS

| | | | |
|---|---|---|---|
| 5,189,417 A | 2/1993 | Caldwell et al. |
| 5,305,017 A | 4/1994 | Gerpheide |
| 5,349,353 A | 9/1994 | Zrilic |
| 5,374,787 A | 12/1994 | Miller et al. |
| 5,488,204 A | 1/1996 | Mead et al. |
| 5,526,294 A | 6/1996 | Ono |
| 5,572,205 A | 11/1996 | Caldwell et al. |
| 5,730,165 A | 3/1998 | Philipp |
| 5,790,106 A | 8/1998 | Hirano et al. |
| 5,790,107 A | 8/1998 | Kasser |
| 5,825,352 A | 10/1998 | Bisset et al. |
| 5,861,583 A | 1/1999 | Schediwy et al. |
| 5,867,111 A | 2/1999 | Caldwell et al. |
| 5,920,309 A | 7/1999 | Bisset et al. |
| 6,075,520 A | 6/2000 | Inoue et al. |
| 6,239,389 B1 | 5/2001 | Allen et al. |
| 6,452,514 B1 | 9/2002 | Philipp |
| 6,466,036 B1 | 10/2002 | Philipp |
| 6,535,200 B2 | 3/2003 | Philipp |
| 6,879,930 B2 | 4/2005 | Sinclair |
| 6,885,365 B1 | 4/2005 | Kang |
| 6,888,536 B2 | 5/2005 | Westerman |
| 6,970,160 B2 | 11/2005 | Mulligan et al. |
| 7,129,714 B2 | 10/2006 | Baxter |
| 7,148,704 B2 | 12/2006 | Philipp |
| 7,265,746 B2 | 9/2007 | Knowles |
| 7,274,353 B2 | 9/2007 | Chiu et al. |
| 7,292,229 B2 | 11/2007 | Morag et al. |
| 7,453,444 B2 | 11/2008 | Geaghan |
| 7,830,157 B2 | 11/2010 | Geaghan |
| 8,077,161 B2 | 12/2011 | Kinoshita |
| 2001/0006369 A1 | 7/2001 | Ely |
| 2003/0076306 A1 | 4/2003 | Zadesky et al. |
| 2003/0122432 A1 | 7/2003 | Caldwell |
| 2004/0004488 A1 | 1/2004 | Baxter |
| 2004/0119701 A1 | 6/2004 | Mulligan et al. |
| 2004/0178997 A1 | 9/2004 | Gillespie et al. |
| 2005/0150697 A1 | 7/2005 | Altman et al. |
| 2006/0012581 A1 | 1/2006 | Haim |
| 2006/0022959 A1 | 2/2006 | Geaghan |
| 2006/0092142 A1 | 5/2006 | Gillespie et al. |
| 2006/0097991 A1 | 5/2006 | Hotelling et al. |
| 2006/0232567 A1 | 10/2006 | Westerman et al. |
| 2007/0074913 A1 | 4/2007 | Geagan et al. |
| 2007/0074915 A1 | 4/2007 | Chung et al. |
| 2007/0084645 A1 | 4/2007 | Chung et al. |
| 2007/0247172 A1 | 10/2007 | Li |
| 2007/0257890 A1 | 11/2007 | Hotelling et al. |
| 2007/0268272 A1 | 11/2007 | Perski et al. |
| 2007/0285365 A1 | 12/2007 | Lee |
| 2008/0004505 A1 | 1/2008 | Kapit et al. |
| 2008/0006453 A1 | 1/2008 | Hotelling |
| 2008/0078590 A1 | 4/2008 | Sequine |
| 2008/0087477 A1 | 4/2008 | Cho et al. |
| 2008/0106520 A1 | 5/2008 | Free et al. |
| 2008/0142281 A1 | 6/2008 | Geaghan |
| 2008/0158167 A1 | 7/2008 | Hotelling et al. |
| 2008/0158169 A1 | 7/2008 | O'Connor et al. |
| 2008/0158175 A1 | 7/2008 | Hotelling |
| 2008/0162996 A1 | 7/2008 | Krah et al. |
| 2008/0162997 A1 | 7/2008 | Vu et al. |
| 2008/0165134 A1 | 7/2008 | Krah |
| 2008/0251299 A1 | 10/2008 | Liao et al. |
| 2008/0309625 A1 | 12/2008 | Krah et al. |
| 2009/0009483 A1 | 1/2009 | Hotelling et al. |
| 2009/0025987 A1 | 1/2009 | Perski |
| 2009/0066670 A1 | 3/2009 | Hotelling et al. |
| 2009/0096757 A1 | 4/2009 | Hotelling et al. |
| 2009/0096758 A1 | 4/2009 | Hotelling et al. |
| 2009/0194344 A1 | 8/2009 | Harley et al. |
| 2009/0219258 A1 | 9/2009 | Geaghan et al. |
| 2009/0244033 A1 | 10/2009 | Westerman |
| 2009/0284495 A1 | 11/2009 | Geaghan et al. |
| 2010/0033437 A1 | 2/2010 | Matsubara |
| 2010/0073323 A1 | 3/2010 | Geaghan |
| 2010/0149110 A1 | 6/2010 | Gray |
| 2010/0188345 A1 | 7/2010 | Keskin |
| 2010/0300773 A1 | 12/2010 | Cordeiro et al. |
| 2011/0007021 A1 | 1/2011 | Bernstein |
| 2011/0157080 A1 | 6/2011 | Ciesla |
| 2011/0261006 A1* | 10/2011 | Joharapurkar et al. ....... 345/174 |

FOREIGN PATENT DOCUMENTS

| | | |
|---|---|---|
| GB | 2072389 | 9/1981 |
| JP | 2288122 | 11/1990 |
| JP | 11305932 | 11/1999 |
| JP | 2000/076014 | 3/2000 |
| JP | 2007/052639 | 3/2007 |
| JP | 2007-334690 | 12/2007 |
| JP | 2009-110418 | 5/2009 |
| JP | 2009/192306 | 8/2009 |
| KR | 10-0453971 | 10/2004 |
| WO | 2004/019258 A2 | 3/2004 |
| WO | 2004/040606 A2 | 5/2004 |
| WO | 2006/104745 A2 | 10/2006 |
| WO | 2007/017848 A2 | 2/2007 |
| WO | 2008/085720 A1 | 7/2008 |

OTHER PUBLICATIONS

Bao et al.; "DOA Estimation Under Unknown Mutual Coupling and Multipath", IEEE Transactions on Aerospace and Electronic Systems IEEE USA, vol. 41, No. 2, Apr. 2005, pp. 565-573.

Geaghan et al., "Low Cost Mutual Capacitance Measuring Circuits and Methods", Presented at SID Conference, Austin, TX, Jun. 3, 2009, 4 pages.

"Operational_Transconductance_Amplifier", Creative Commons Attribution-ShareALike [On-line], [updated on the internet Apr. 15, 2010], URL<http://en.wikipedia.org/wiki/Operational_transconductance_amplifier>.

SID Conference Presentation, "Low Cost Mutual Capacitance Measuring Circuit", 3M Touch Systems, San Antonio, Texas, 9 pages, © 2009.

U.S. Appl. No. 12/575,860, "Multi-touch Device with Multiple Drive Frequencies and Maximum Likelihood Estimation", filed Oct. 8, 2009.

U.S. Appl. No. 12/618,874, "Touch Sensitive Device Using Threshold Voltage Signal", filed Nov. 16, 2009.

U.S. Appl. No. 12/652,343, "High Speed Noise Tolerant Multi-touch Touch Device and Controller Therfor", filed Jan. 5, 2010.

U.S. Appl. No. 61/348,173, "High Speed Low Power Multi-touch Touch Device and Controller Therfor", filed May 25, 2010.

International Search Report Form PCT/ISA/210, International Application No. PCT/US2011/037096, International Filing Date: May 19, 2011, 8 pages.

* cited by examiner

HIGH SPEED LOW POWER MULTI-TOUCH TOUCH DEVICE AND CONTROLLER THEREFOR

CROSS REFERENCE TO RELATED APPLICATIONS

This application claims the benefit of U.S. Provisional Patent Application No. 61/348,173, filed May 25, 2010, the disclosure of which is incorporated by reference herein in its entirety.

CROSS REFERENCE TO RELATED APPLICATIONS

This application is related to U.S. Patent Application No. 61/182,366, "High Speed Multi-Touch Device and Controller Therefor" filed May 29, 2009; and U.S. Patent Application No. 61/231,471, "High Speed Multi-Touch Device and Controller Therefor" filed Aug. 5, 2009; and U.S. patent application Ser. No. 12/652,343, "High Speed Noise Tolerant Multi-Touch Touch Device and Controller Therefor" filed Jan. 5, 2010.

FIELD OF THE INVENTION

This invention relates generally to touch-sensitive devices, particularly those that rely on a capacitive coupling between a user's finger or other touch implement and the touch device, with particular application to such devices that are capable of detecting multiple touches applied to different portions of the touch device at the same time.

BACKGROUND

Touch sensitive devices allow a user to conveniently interface with electronic systems and displays by reducing or eliminating the need for mechanical buttons, keypads, keyboards, and pointing devices. For example, a user can carry out a complicated sequence of instructions by simply touching an on-display touch screen at a location identified by an icon.

There are several types of technologies for implementing a touch sensitive device including, for example, resistive, infrared, capacitive, surface acoustic wave, electromagnetic, near field imaging, etc. Capacitive touch sensing devices have been found to work well in a number of applications. In many touch sensitive devices, the input is sensed when a conductive object in the sensor is capacitively coupled to a conductive touch implement such as a user's finger. Generally, whenever two electrically conductive members come into proximity with one another without actually touching, a capacitance is formed therebetween. In the case of a capacitive touch sensitive device, as an object such as a finger approaches the touch sensing surface, a tiny capacitance forms between the object and the sensing points in close proximity to the object. By detecting changes in capacitance at each of the sensing points and noting the position of the sensing points, the sensing circuit can recognize multiple objects and determine the characteristics of the object as it is moved across the touch surface.

There are two known techniques used to capacitively measure touch. The first is to measure capacitance-to-ground, whereby a signal is applied to an electrode. A touch in proximity to the electrode causes signal current to flow from the electrode, through an object such as a finger, to electrical ground.

The second technique used to capacitively measure touch is through mutual capacitance. Mutual capacitance touch screens apply a signal to a driven electrode, which is capacitively coupled to a receiver electrode by an electric field. Signal coupling between the two electrodes is reduced by an object in proximity, which reduces the capacitive coupling.

Within the context of the second technique, various additional techniques have been used to measure the mutual capacitance between electrodes. In one such technique, a capacitor coupled to a receiver electrode is used to accumulate multiple charges associated with multiple pulses of a drive signal. Each pulse of the drive signal thus contributes only a small portion of the total voltage built up on this "integrating capacitor". Reference is made to U.S. Pat. No. 6,452,514 (Philipp).

BRIEF SUMMARY

The present application discloses, inter alia, touch-sensitive devices capable of detecting multiple touches applied to different portions of the touch device at the same time or at overlapping times. Moreover, the touch devices may consume little power compared with circuits that incorporate operational amplifiers requiring multiple power sources. To accomplish this, assuming a suitable pulse shape is used for the drive signal, differentiation circuits are in one embodiment coupled to the receive electrodes so that a differentiated representation of the drive signal, referred to as a response signal, is generated for each receive electrode. In an exemplary embodiment, each differentiation circuit may comprise a simple resistor-capacitor (RC) circuit. The differentiated representation of the drive signal is then amplified using a transistor-based amplifier, the amplified signal then used to build up a signal in a charge accumulator, which after one or more drive cycles is sampled. The measured value of the accumulated signal from the charge accumulator is, then, a surrogate for the capacitive coupling at a given node, and changes to that capacitive coupling may be indicative of the proximity of a finger or other object to the given node (e.g., a touch to a touch screen). The transistor amplifier in one embodiment is a voltage-to-current amplifier with an input first transistor configured to amplify the input, and a second transistor configured as a current source output to charge the charge accumulator, which may in some cases simply be a capacitor. Other known transistor-based amplification circuit designs can also be used, but in exemplary embodiments the transistor amplifier does not utilize a feedback but instead runs open-loop. In some cases, the circuitry may provides an output that includes in some form at least an approximation of the derivative with respect to time of the drive signal, which may be provided as a response signal to the transistor amplifier. The transistor amplifier may be biased in such a way as to significantly reduce power consumption by the circuit, as compared with certain amplifiers that rely on one or more operational amplifier devices for their operation.

A characteristic amplitude, such as a peak amplitude or average amplitude, of the response signal is indicative of the capacitive coupling between the drive electrode and the receive electrode being sampled. A touch at the node corresponding to the particular drive and receive electrodes has the effect of reducing capacitive coupling and reducing the characteristic amplitude. Such a reduction in amplitude can be measured over several pulses of the drive signal, but in one embodiment may be measured even with only a single pulse of the drive signal. Since every column electrode has a parallel receive circuit, multiple touches at different portions of the column electrodes, of the touch device, that occur simultaneously, or overlapping, in time can be detected in this manner. If noise reduction is desired, it may be beneficial to employ multiple pulses from a drive signal for each drive/receive electrode pair (i.e., node).

The application also discloses touch-sensitive apparatuses that include a touch panel, a drive unit, a sense unit, and a measurement unit. The panel may include a touch surface and a plurality of electrodes defining an electrode matrix, the plurality of electrodes including a plurality of drive electrodes and a plurality of receive electrodes. Each drive electrode is capacitively coupled to each receive electrode at a respective node of the matrix. The panel is configured such that a touch on the touch surface proximate a given one of the nodes changes a coupling capacitance between the drive electrode and the receive electrode associated with the given node. The drive unit, in turn, is configured to generate a drive signal and to deliver the drive signal to the drive electrodes, e.g. one at a time through a multiplexer. The drive signal may be or include only one individual drive pulse, or it may include a plurality or train of such drive pulses. The sense unit may be configured to generate, for each drive signal delivered to each drive electrode, response signals for the plurality of receive electrodes that are capacitively coupled to such drive electrode, each response signal in one embodiment including a differentiated representation of the drive signal. The amplitude of each of these response signals is a function of the coupling capacitance at the associated node. A charge accumulator is preferably employed to accumulate charge associated with each response signal to provide an accumulated signal, a voltage level or other magnitude of the accumulated signal also being responsive to the coupling capacitance at the associated node of the electrode matrix. Finally, the measurement unit is preferably configured to measure the accumulated signal for each of the nodes, and to determine therefrom the positions of multiple temporally overlapping touches, if present, on the touch surface.

The shape of the drive pulse(s) used in the drive signal may be tailored or selected so as to provide a desired waveform shape for the response signals. For example, if a rectangle shape is used for the drive pulse, the response signal generated by the sense unit typically comprises a pair of opposite polarity impulse pulses, the peak amplitude of which can be isolated with a peak detector and optional sample/hold buffer. Alternatively, if a ramp-shaped drive pulse is selected, the response signal typically comprises a pulse shape that is nominally rectangular, i.e., it includes a relatively constant amplitude plateau disposed between two relatively steep high-to-low transitions. Such a rectangular-shaped response signal allows for the possible elimination of certain circuit elements, and overall simplification of the touch device.

In some cases, the transistor amplifier may be unipolar. For example, the transistor amplifier may couple to a positive power supply (+Vcc) and to ground, but not to a negative power supply (−Vcc). Similarly, the transistor amplifier may couple to a negative power supply (−Vcc) and to ground, but not to a positive power supply (+Vcc). The transistor amplifier may include first and second transistors, and in some cases, it may include no other transistors. Each transistor may include a base, a collector, and an emitter. One transistor may be an NPN-type transistor, while the other may be a PNP-type transistor. A collector of the first transistor may couple to a base of the second transistor. The charge accumulator may couple between an emitter of the first transistor and a collector of the second transistor.

The sense unit may include a reference circuit, and the reference circuit may couple between the drive unit and the transistor amplifier. The reference circuit may generate the response signals, which may be differentiated representations of the drive signals, the differentiation of each response signal being based on the coupling capacitance of the node associated with the response signal. The reference circuit may include a resistance through which the coupling capacitance of each node is discharged. A base of the first transistor of the transistor amplifier may couple to the reference circuit. The reference circuit may be adapted to bias the base of the first transistor. The reference circuit may be unipolar, and the transistor amplifier may also be unipolar.

The disclosed apparatuses may also include a reset circuit configured to reset the charge accumulator. A measurement unit of the apparatus may convert each accumulated signal from the charge accumulator into a digital representation indicative of a touch or near-touch at the associated node of the electrode matrix.

Related methods, systems, and articles are also discussed.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF DRAWINGS

In the figures, like reference numerals designate like elements.

DETAILED DESCRIPTION OF ILLUSTRATIVE EMBODIMENTS

Figure 1:
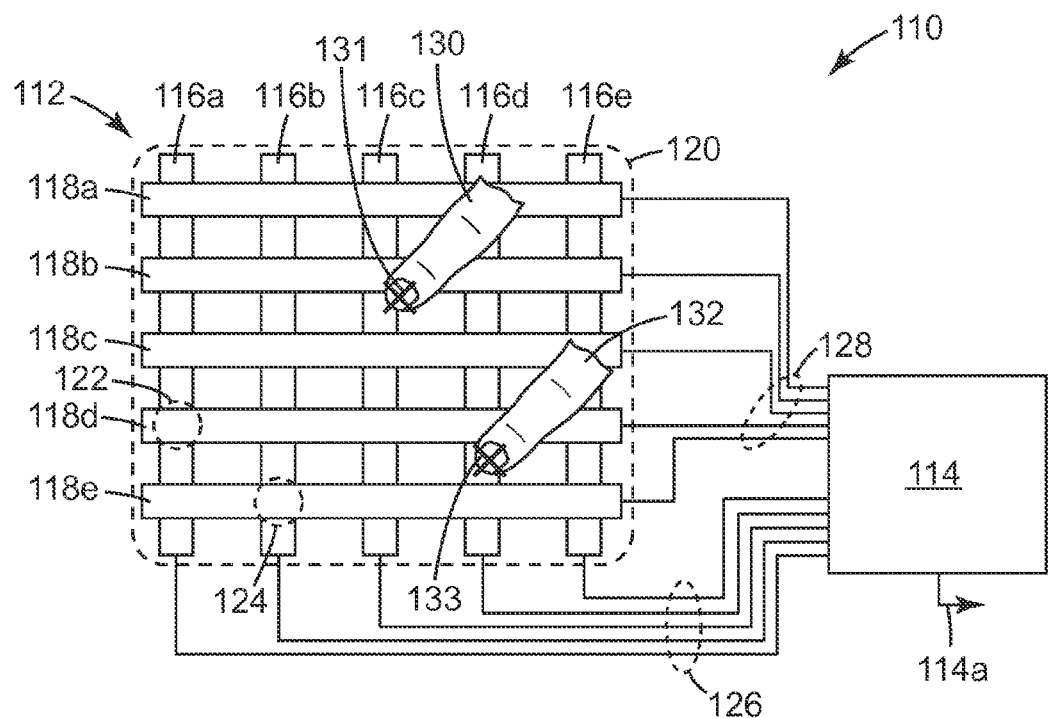
FIG. 1 is a schematic view of a touch device.

In FIG. 1, an exemplary touch device 110 is shown. The device 110 includes a touch panel 112 connected to electronic circuitry, which for simplicity is grouped together into a single schematic box labeled 114 and referred to collectively as a controller.

The touch panel 112 is shown as having a 5×5 matrix of column electrodes 116a-e and row electrodes 118a-e, but other numbers of electrodes and other matrix sizes can also be used. The panel 112 is typically substantially transparent so that the user is able to view an object, such as the pixilated display of a computer, hand-held device, mobile phone, or other peripheral device, through the panel 112. The boundary 120 represents the viewing area of the panel 112 and also preferably the viewing area of such a display, if used. The electrodes 116a-e, 118a-e are spatially distributed, from a plan view perspective, over the viewing area 120. For ease of illustration the electrodes are shown to be wide and obtrusive, but in practice they may be relatively narrow and inconspicuous to the user. Further, they may be designed to have variable widths, e.g., an increased width in the form of a diamond- or other-shaped pad in the vicinity of the nodes of the matrix in order to increase the inter-electrode fringe field and thereby increase the effect of a touch on the electrode-to-electrode capacitive coupling. In exemplary embodiments the electrodes may be composed of indium tin oxide (ITO) or other suitable electrically conductive materials. From a depth perspective, the column electrodes may lie in a different plane than the row electrodes (from the perspective of FIG. 1, the column electrodes 116a-e lie underneath the row electrodes 118a-e) such that no significant ohmic contact is made between column and row electrodes, and so that the only significant electrical coupling between a given column electrode and a given row electrode is capacitive coupling. In other embodiments, the row electrode and discreet column electrode components may be disposed on the same substrate, in the same layer, then bridging jumper electrodes configured to connect the discreet column electrode components (spaced apart from the column electrode by a dielectric) to thus form x- and y-electrodes using a substantially single layer construction. The matrix of electrodes typically lies beneath a cover glass, plastic film, or the like, so that the electrodes are protected from direct physical contact with a user's finger or other touch-related implement. An exposed surface of such a cover glass, film, or the like may be referred to as a touch surface. Additionally, in display-type applications, a back shield may be placed between the display and the touch panel 112. Such a back shield typically consists of a conductive ITO coating on a glass or film, and can be grounded or driven with a waveform that reduces signal coupling into touch panel 112 from external electrical interference sources. Other approaches to back shielding are known in the art. In general, a back shield reduces noise sensed by touch panel 112, which in some embodiments may provide improved touch sensitivity (e.g., ability to sense a lighter touch) and faster response time. Back shields are sometimes used in conjunction with other noise reduction approaches, including spacing apart touch panel 112 and a display, as noise strength from LCD displays, for example, rapidly decreases over distance. In addition to these techniques, other approaches to dealing with noise problems are discussed in reference to various embodiments, below.

The capacitive coupling between a given row and column electrode is primarily a function of the geometry of the electrodes in the region where the electrodes are closest together. Such regions correspond to the "nodes" of the electrode matrix, some of which are labeled in FIG. 1. For example, capacitive coupling between column electrode 116a and row electrode 118d occurs primarily at node 122, and capacitive coupling between column electrode 116b and row electrode 118e occurs primarily at node 124. The 5×5 matrix of FIG. 1 has 25 such nodes, any one of which can be addressed by controller 114 via appropriate selection of one of the control lines 126, which individually couple the respective column electrodes 116a-e to the controller, and appropriate selection of one of the control lines 128, which individually couple the respective row electrodes 118a-e to the controller.

When a finger 130 of a user or other touch implement comes into contact or near-contact with the touch surface of the device 110, as shown at touch location 131, the finger capacitively couples to the electrode matrix. The finger capacitively couples to the matrix, and draws charge away from the matrix, particularly from those electrodes lying closest to the touch location, and in doing so it changes the coupling capacitance between the electrodes corresponding to the nearest node(s). For example, the touch at touch location 131 lies nearest the node corresponding to electrodes 116c/118b. As described further below, this change in coupling capacitance can be detected by controller 114 and interpreted as a touch at or near the 116a/118b node. Preferably, the controller is configured to rapidly detect the change in capacitance, if any, of all of the nodes of the matrix, and is capable of analyzing the magnitudes of capacitance changes for neighboring nodes so as to accurately determine a touch location lying between nodes by interpolation. Furthermore, the controller 114 advantageously is designed to detect multiple distinct touches applied to different portions of the touch device at the same time, or at overlapping times. Thus, for example, if another finger 132 touches the touch surface of the device 110 at touch location 133 simultaneously with the touch of finger 130, or if the respective touches at least temporally overlap, the controller is preferably capable of detecting the positions 131, 133 of both such touches and providing such locations on a touch output 114a. The number of distinct simultaneous or temporally overlapping touches capable of being detected by controller 114 is preferably not limited to 2, e.g., it may be 3, 4, or more, depending on the size of the electrode matrix.

As discussed further below, the controller 114 preferably employs a variety of circuit modules and components that enable it to rapidly determine the coupling capacitance at some or all of the nodes of the electrode matrix. For example, the controller preferably includes at least one signal generator or drive unit. The drive unit delivers a drive signal to one set of electrodes, referred to as drive electrodes. In the embodiment of FIG. 1, the column electrodes 116a-e may be used as drive electrodes, or the row electrodes 118a-e may be so used. The drive signal may be delivered to the electrodes in various ways, e.g., one drive electrode at a time in a scanned sequence from a first to a last drive electrode. As each such electrode is driven, the controller monitors the other set of electrodes, referred to as receive electrodes. The controller 114 may include one or more sense units coupled to all of the receive electrodes. For each drive signal that is delivered to each drive electrode, the sense unit(s) generate response signals for the plurality of receive electrodes. The sense unit(s) is (are) designed in one embodiment such that each response signal comprises a differentiated representation of the drive signal. For example, if the drive signal is represented by a function f(t), which may represent voltage as a function of time, then the response signal may be or comprise, at least approximately, a function g(t), where g(t)=df(t)/dt. In other words, g(t) is the derivative with respect to time of the drive signal f(t). Depending on the design details of the circuitry used in the controller 114, the response signal may include: (1) g(t) alone; or (2) g(t) with a constant offset (g(t)+a); or (3) g(t) with a multiplicative scaling factor (b*g(t)), the scaling factor capable of being positive or negative, and capable of having a magnitude greater than 1, or less than 1 but greater than 0; or (4) combinations thereof, for example. In any case, the amplitude of the response signal is advantageously related to the coupling capacitance between the drive electrode being driven and the particular receive electrode being monitored. Of course, the amplitude of g(t) is also proportional to the amplitude of the original function f(t). Note that the amplitude of g(t) can be determined for a given node using only a single pulse of a drive signal, if desired. In other embodiments, the response signal is not differentiated. For example, in the circuit of FIG. 3 discussed further below, the values of R1 and $C_c$ may be large enough, and/or the modulation speed of the drive signal may be fast enough, such that the RC time constant associated with R1 and $C_c$, is much slower than the transitions of the drive signal, in which case the response signal may not be fairly representative of a time derivative of the drive signal, even though the response signal will still be a function of R1 and $C_c$.

The controller may also include circuitry to accumulate charge from a series of response signal inputs. Exemplary circuit devices for this purpose may include one or more charge accumulators 326a, e.g., one or more capacitors, the selection of which may depend on the nature of the drive signal and the corresponding response signal. Each pulse results in the accumulation of some quantum of charge and each additional pulse adds successively more. The controller may also include one or more analog-to-digital converters (ADCs) to convert the analog amplitude of the accumulated signal to a digital format. One or more multiplexers may also be used to avoid unnecessary duplication of circuit elements. Of course, the controller also preferably includes one or more memory devices in which to store the measured amplitudes and associated parameters, and a microprocessor to perform the necessary calculations and control functions.

By measuring the voltage of the accumulated charge associated with the response signal for each of the nodes in the electrode matrix for one or more pulses associated with a given measurement cycle, the controller can generate a matrix of measured values related to the coupling capacitances for each of the nodes of the electrode matrix. These measured values can be compared to a similar matrix of previously obtained reference values in order to determine which nodes, if any, have experienced a change in coupling capacitance due to the presence of a touch.

Figure 2:
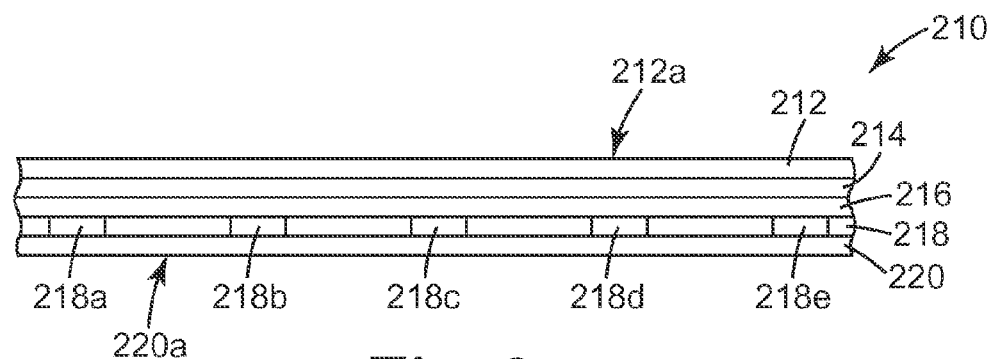
FIG. 2 is a schematic side view of a portion of a touch panel used in a touch device.

Turning now to FIG. 2, we see there a schematic side view of a portion of a touch panel 210 for use in a touch device. The panel 210 includes a front layer 212, first electrode layer 214 comprising a first set of electrodes, insulating layer 216, second electrode layer 218 comprising a second set of electrodes 218a-e preferably orthogonal to the first set of electrodes, and a rear layer 220. The exposed surface 212a of layer 212, or the exposed surface 220a of layer 220, may be or comprise the touch surface of the touch panel 210.

Figure 3:
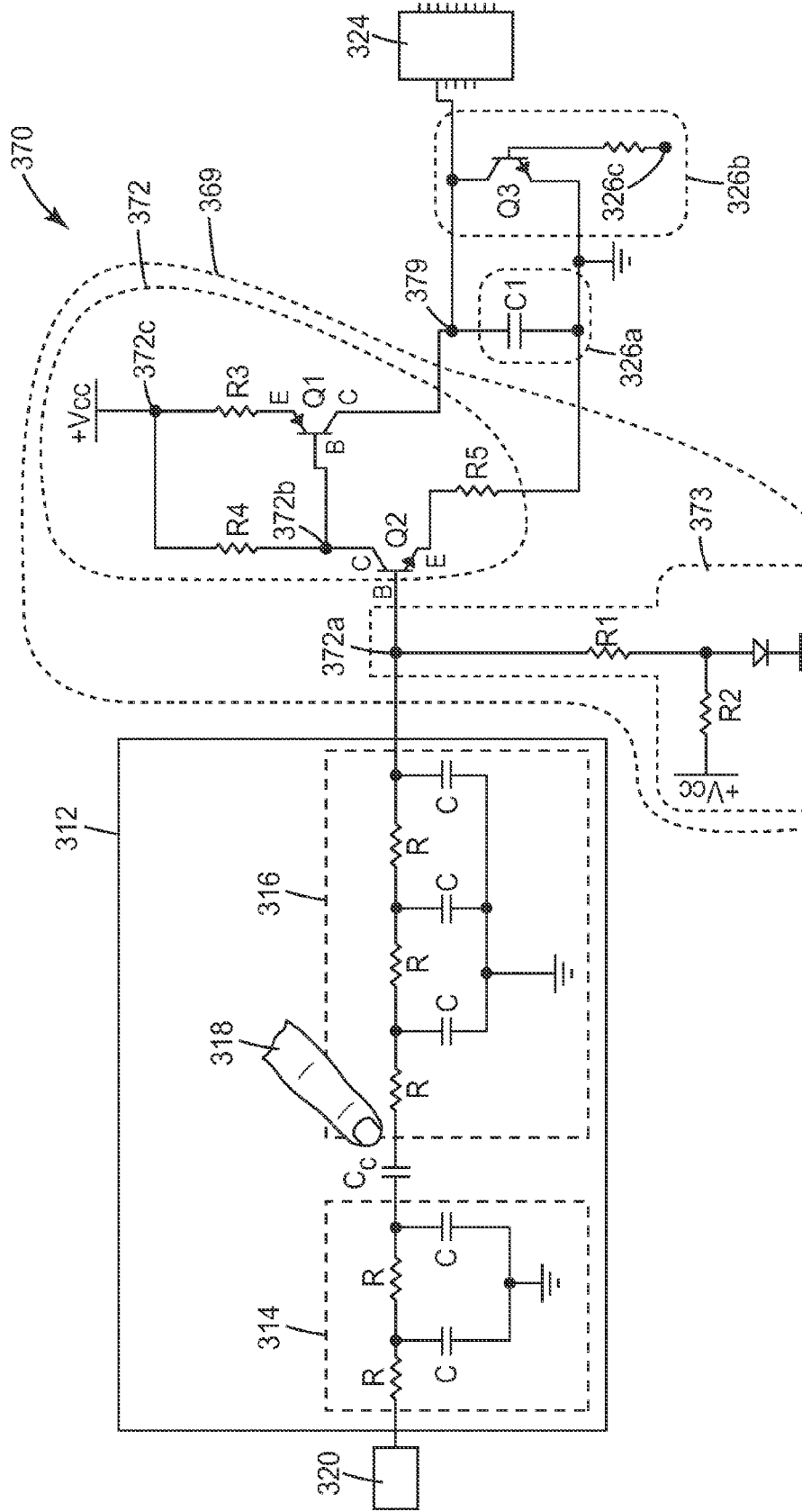
FIG. 3 is a schematic view of a touch device in which relevant drive and detection circuitry is shown in the context of one drive electrode and one receive electrode capacitively coupled thereto.

FIG. 3 depicts a touch device 370 in which relevant controller circuitry, such as drive and detection circuitry, is shown in the context of a touch panel 312 having one drive electrode 314 and one receive electrode 316 capacitively coupled thereto via coupling capacitance $C_c$. The reader will understand that this is a generalization of a touch panel in which drive electrode 314 may be one of a plurality of drive electrodes, and receive electrode 316 likewise may be one of a plurality of receive electrodes, arranged in a matrix on the touch panel.

Indeed, in one specific embodiment of interest capable of use with at least some of the touch measurement techniques described herein, the touch panel may comprise a 40×64 (40 rows, 64 columns) matrix device having a 19 inch diagonal rectangular viewing area with a 16:10 aspect ratio. In this case, the electrodes may have a uniform spacing of about 0.25 inches. Due to the size of this embodiment, the electrodes may have significant stray impedances associated therewith, e.g., a resistance of 40K ohms for the row electrodes and 64K ohms for the column electrodes. For good human factors touch response, the response time to measure the coupling capacitance at all 2,560 nodes of the matrix (40*64=2560) may, if desired, be made to be relatively fast, e.g., less than 20 or even less than 10 milliseconds. If the row electrodes are used as the drive electrodes and the column electrodes used as the receive electrodes, and if all of the column electrodes are sampled simultaneously, then the 40 rows of electrodes have, for example, 20 msec (or 10 msec) to be scanned sequentially, for a time budget of 0.5 msec (or 0.25 msec) per row electrode (drive electrode).

The drive electrode 314 and receive electrode 316 of FIG. 3a, which are depicted by their electrical characteristics (in the form of lumped circuit element models) rather than by their physical characteristics, are representative of electrodes that may be found in a touch device having a matrix smaller than 40×64, but this is not to be considered limiting. In this representative embodiment of FIG. 3, the series resistances R shown in the lumped circuit models may each have values of 10K ohms, and the stray capacitances C shown in the lumped circuit models may each have values of 20 picofarads (pf), but of course these values are not to be taken as limiting in any way. In this representative embodiment the coupling capacitance $C_c$ is nominally 2 pf, and the presence of a touch by a user's finger 318 at the node between electrodes 314, 316 causes the coupling capacitance $C_c$ to drop by about 25%, to a value of about 1.5 pf. Again, these values are not to be taken as limiting.

In accordance with the controller described earlier, the touch device 370 uses specific circuitry to interrogate the panel 312 so as to determine the coupling capacitance $C_c$ at each of the nodes of the panel 312. In this regard, the reader will understand that the controller may determine the coupling capacitance by determining the value of a parameter that is indicative of, or responsive to, the coupling capacitance, e.g., an accumulated charge as mentioned above and described further below. To accomplish this task, the device 370 preferably includes: a low impedance drive unit 320 coupled to the drive electrode 314; a sense unit 369 coupled to the receive electrode 316, which generates a response signal as a function of the coupling capacitance (in some embodiments the response signal may fairly represent a time derivative of the drive signal) and amplifies the response signal using an open loop transistor amplifier, such as transistor amplifier 372; a charge accumulator 326a coupled to the sense unit 369, the charge accumulator adapted to accumulate charge as a function of the response signal so as to provide an accumulated signal for each node, the accumulated signal being associated with one or more pulses of the drive signal and having an amplitude, magnitude, charge, or voltage that is responsive to the coupling capacitance of the node corresponding to the response signal; and an analog-to-digital converter (ADC) unit 324 that converts an accumulated charge resulting from the response signal generated by the sense unit 322 into a digital format. Depending on the nature of the drive signal supplied by the drive unit 320 (and hence also on the nature of the response signal generated by the sense unit 322), the charge accumulator circuit 326a may also serve as a sample/hold buffer, and an associated reset circuit 326b operable to reset the charge accumulator 326a may also be included. In most practical applications the device 370 will also include a multiplexer between the signal generator 320 and the touch panel 312, so as to have the capability of addressing any one of a plurality of drive electrodes at a given time, as well as a multiplexer before the ADC unit 324, to allow a single ADC unit to rapidly sample the amplitudes associated with multiple receive electrodes, thus avoiding the expense of requiring one ADC unit for each receive electrode.

The drive unit 320 preferably is or includes a voltage source with internal impedance that is preferably low enough to maintain good signal integrity, reduce injected noise, and/or maintain fast signal rise and fall times. The drive unit 320 provides a time-varying drive signal at an output thereof to the drive electrode 314. The drive signal may consist essentially of a single, isolated pulse, or it may comprise a plurality of such pulses or a train of pulses that form a continuous AC waveform, or waveform packet, such as a sinusoidal wave, a square wave, a triangle wave, and so forth. In this regard, the term "pulse" is used in a broad sense to refer to a distinctive signal variation and is not limited to a rectangular shape of short duration and high amplitude. If rapid detection of touch (es) on the touch panel is desired, the drive signal preferably includes only the smallest number of pulses necessary to obtain a reliable measurement of the coupling capacitance at a given node. This becomes particularly important for touch panels that have large electrode matrices, i.e., a large number of nodes to sense. The peak or maximum amplitude of the drive pulse(s) is preferably relatively high, e.g., from 3 to 20 volts, to provide good signal-to-noise ratios. Though shown in FIG. 3 as driving electrode 314 from only one end, in some embodiments drive unit 320 may be configured to drive electrode 314 from both of its ends. This may be useful, for example, when electrode 314 has high resistance (thus increased drive signal attenuation and susceptibility to noise contamination), as may exist on large ITO-based matrix-type touch sensors.

The reader should keep in mind that there may be a distinction between the drive signal provided at the output of drive unit 320, and the drive signal being delivered to a particular drive electrode 314. The distinction becomes important when, for example, a multiplexer or other switching device is placed between the drive unit 320 and the touch panel 312 in order to selectively couple the drive unit to a plurality of drive electrodes, e.g., one at a time. In such a case, the drive unit 320 may have at its output a continuous AC waveform, such as square wave, triangle wave, or the like, yet by virtue of the switching action of the multiplexer, only one pulse of such a waveform, or only a few pulses, may be delivered to any given drive electrode at a time. For example, one pulse of a continuous AC waveform may be delivered to a first drive electrode, the next pulse of the AC waveform may be delivered to the next drive electrode, and so on until all drive electrodes have been driven, whereupon the next pulse of the AC waveform is delivered again to the first drive electrode and so forth in a repeating cycle.

As explained elsewhere herein, the shape of the pulses used in the drive signal may have an impact on the choice of detection/measurement electronics to be used in the device. Examples of useable pulse shapes include rectangle pulses, ramped pulses (whether symmetric or asymmetric), and sine wave (e.g., bell-shaped) pulses.

The drive unit 320 may if desired be programmable to provide different pulses at different times. For example, if the drive unit is coupled to a plurality of drive electrodes through a multiplexer, the drive unit may be programmed to provide different signal levels for different drive electrodes to compensate for electrode-to-electrode variations in line resistance and stray capacitance. For example, a drive electrode disposed at a position that requires a long conduction length through the receive electrode(s) is beneficially driven with a higher amplitude drive signal than a drive electrode disposed at a position that requires a shorter conduction length, so as to compensate for losses associated with the receive electrodes. (For example, referring to the electrode matrix of FIG. 1, if row electrodes 118a-e are the drive electrodes, then a drive signal on electrode 118a is coupled through longer lengths of the receive electrodes 116a-e than a drive signal on electrode 118e due to the placement of the control lines 126 proximate electrode 118e.) Providing different drive signal levels for different drive electrodes in this way is particularly advantageous for large electrode matrices, because rather than programming a large number of detection circuits (corresponding to the number of receive electrodes) for losses in the touch screen, only one drive signal is adjusted by a selected amount, with drive signals delivered to different drive electrodes being adjusted by differing amounts as appropriate.

The drive signal provided to the drive electrode 314 is capacitively coupled to receive electrode 316 via the coupling capacitance $C_c$, the receive electrode in turn being connected to sense unit 369. The sense unit 369 thus receives at an input thereof 372a the drive signal (as transmitted by the electrodes 314, 316 and coupling capacitance $C_c$), and generates therefrom a response signal at an output 379. In one embodiment the sense unit is designed so that the response signal includes a differentiated representation of the drive signal, an amplitude of which is responsive to the coupling capacitance $C_c$. That is, the response signal generated by the sense unit may in some embodiments include in some form at least an approximation of the derivative with respect to time of the drive signal. For example, the response signal may include the time derivative of the drive signal, or a version of such signal that is inverted, amplified (including amplification less than 1), converted to a current, offset in voltage or amplitude, and/or offset in time, for example. To repeat from the earlier discussion, if the drive signal delivered to the drive electrode is represented by a function f(t), then the response signal may be or comprise, at least approximately, a function g(t), where g(t)=d f(t)/dt. In other embodiments, however, the response signal is not differentiated. For example, as mentioned above, the values of R1 and $C_c$ in device 370 may be large enough, and/or the modulation speed of the drive signal may be fast enough, such that the RC time constant associated with R1 and $C_c$, is much slower than the transitions of the drive signal, in which case the response signal may not be fairly representative of a time derivative of the drive signal, even though the response signal will still be a function of R1 and $C_c$. Alternatively, the values of R1 and $C_c$ may be small enough, and/or the modulation speed of the drive signal may be slow enough, such that the RC time constant associated with R1 and $C_c$, is on the order of or faster than the transitions of the drive signal, in which case the response signal may be fairly representative of a time derivative of the drive signal. The differentiated signal may advantageously provide a short pulse to the transistor amplifier, minimize noise coupling, and provide a fast response time for the charge accumulator.

An exemplary circuit to perform such function is shown in FIG. 3. FIG. 3 depicts touch device 370, which uses a transistor-based amplifier circuit 372 to charge a capacitor, C1, which is sampled by ADC unit 324 to determine capacitive coupling at Cc indicative of a touch. The transistor amplifier circuit 372 includes two transistors, Q2 and Q1 as shown, where Q2 is an NPN-type transistor and Q1 is a PNP-type resistor, although other configurations are also contemplated. The base (B), emitter (E), and collector (C) of each transistor is labeled in the figure. The differentiated signal in device 370 is produced by the capacitor Cc and the termination resistor R1, the resistor R1 in the depicted embodiment being included as part of a common reference circuit 373. The reference circuit 373, which also includes a pull-up resistor R2 which is typically larger than R1, may be configured to produce a reference voltage to bias the transistor Q2 as desired, e.g., the transistor Q2 may be biased by an amount substantially equal to its threshold voltage such that it is "just on". Termination resistor R1 may be selected to maximize the differentiated signal level while keeping signal distortion low. Common reference circuit 373 is in one embodiment configured to produce a 0.7V bias. In other configurations, it may be adjusted to 0V, which may reduce or eliminate silver migration issues in the sensor caused by DC voltage offsets in the sensor. In the former case, the input to transistor amplifier 372 (point 372a) is maintained at 0.7V, and a small differentiated signal from Cc is observed at that point.

Besides the transistors Q1 and Q2, transistor amplifier may also include resistors R3, R4, and R5 as shown to provide the appropriate amount of amplification and other relevant circuit characteristics. Transistor amplifier 372 amplifies the differentiated signal that occurs at point 372a, which is then used to charge capacitor C1 in charge accumulator 326a. Finger 318 in proximity to capacitor Cc will cause, over a number of drive waveforms, such as pulses, provided by drive unit 320, a smaller charge to accumulate in capacitor C1 than would occur in the absence of finger 318. After one or more pulses from drive unit 320, the charge on capacitor C1 (e.g. the voltage across capacitor C1) is sampled and converted to a digital value by ADC 324. After sampling, the capacitor C1 of charge accumulator 326a is reset by reset circuit 326b in advance of a subsequent measurement cycle.

Open loop transistor amplifier 372 amplifies the signal occurring at point 372a, and has no feedback loop (hence, open) unlike typical amplifier circuits that utilize operational amplifiers. The two bipolar transistors shown in transistor amplifier 372 are configured as an inverting gain stage followed by a current amplifier to charge the capacitor C1. The circuit can also be configured as a field effect transistor (FET) amplifier pair. Transistor amplifier 372 has a bias current of about 100 uA as the transistors are biased barely on normally by the reference circuit 373, and only respond when the drive pulses occur at the input of the sense unit. Note that in some configurations, including that shown with respect to device 370, the circuit only requires a positive operating voltage +Vcc, which, compared with configurations that include both a positive and negative power supply for operational amplifiers, results in lower overall power requirements. The sense unit 369, the reference circuit 373, and/or the transistor amplifier circuit 372 may thus be advantageously configured as unipolar circuits.

In embodiments in which receive electrode 316 is one of a plurality of receive electrodes, it may be desirable to include a dedicated sense unit 369 for each receive electrode. Further, it may be advantageous to provide different amounts of amplification (e.g., different resistor values for those resistors in transistor amplifier 372) for the different sense units to compensate for signal losses in the touch screen that are different for different drive electrodes. For example, a receive electrode disposed at a position that requires a long conduction length through the drive electrode(s) is beneficially provided with a greater amplification than a receive electrode disposed at a position that requires a shorter conduction length, so as to compensate for losses associated with the drive electrodes. (For example, referring to the electrode matrix of FIG. 1, if row electrodes 116a-e are the receive electrodes, then a signal received from electrode 116a is coupled through longer lengths of the drive electrodes 118a-e than a signal received from electrode 116e due to the placement of the control lines 128 proximate electrode 116e.) Providing different amounts of amplification for different receive electrodes in this way is particularly advantageous for large electrode matrices, because it can reduce the need to program a large number of detection circuits (corresponding to the number of receive electrodes) for losses in the touch screen.

As mentioned previously, the ADC 324 is preferably provided to convert the accumulated charge associated with one or more pulses of the response signal to a digital format, in one embodiment by sampling its voltage, for use with digital components such as a microprocessor for further processing. The ADC may be of any suitable design, e.g., it may comprise a high speed successive approximation register (SAR) and/or a sigma-delta type converter.

With regard to further processing of the accumulated charge value of a given node, the accumulated charge value, or voltage value, can be stored in a memory register. If desired, multiple such values associated with the given node may be stored and averaged, e.g. for noise reduction purposes. Furthermore, the measured amplitude value is preferably compared to a previous sampled (reference) value in order to determine if a reduction of the coupling capacitance has occurred, i.e., if some amount of touch is present at the given node. Such comparison may involve subtraction of the measured value from the reference value, for example. The reference value may comprise a running average of all previous values within a normal range. The average would thus provide a correction for any long term changes in sensor characteristics given changes in temperature of other environmental factors. In embodiments involving a large touch matrix containing many nodes, the measured values for all of the nodes may be stored in memory, and individually compared to respective reference values in order to determine changes in Cc for each node (changes above a threshold being indicative of a touch near that node). By analyzing the comparison data, the positions of multiple temporally overlapping touches, if present on the touch surface, can be determined. The number of temporally overlapping touches capable of being detected may be limited only by the dimensions of the electrode grid in the touch panel and the speed of the drive/detection circuitry. In exemplary embodiments, interpolation is performed for differences detected for neighboring nodes so as to accurately determine a touch location lying between nodes.

Figure 4:
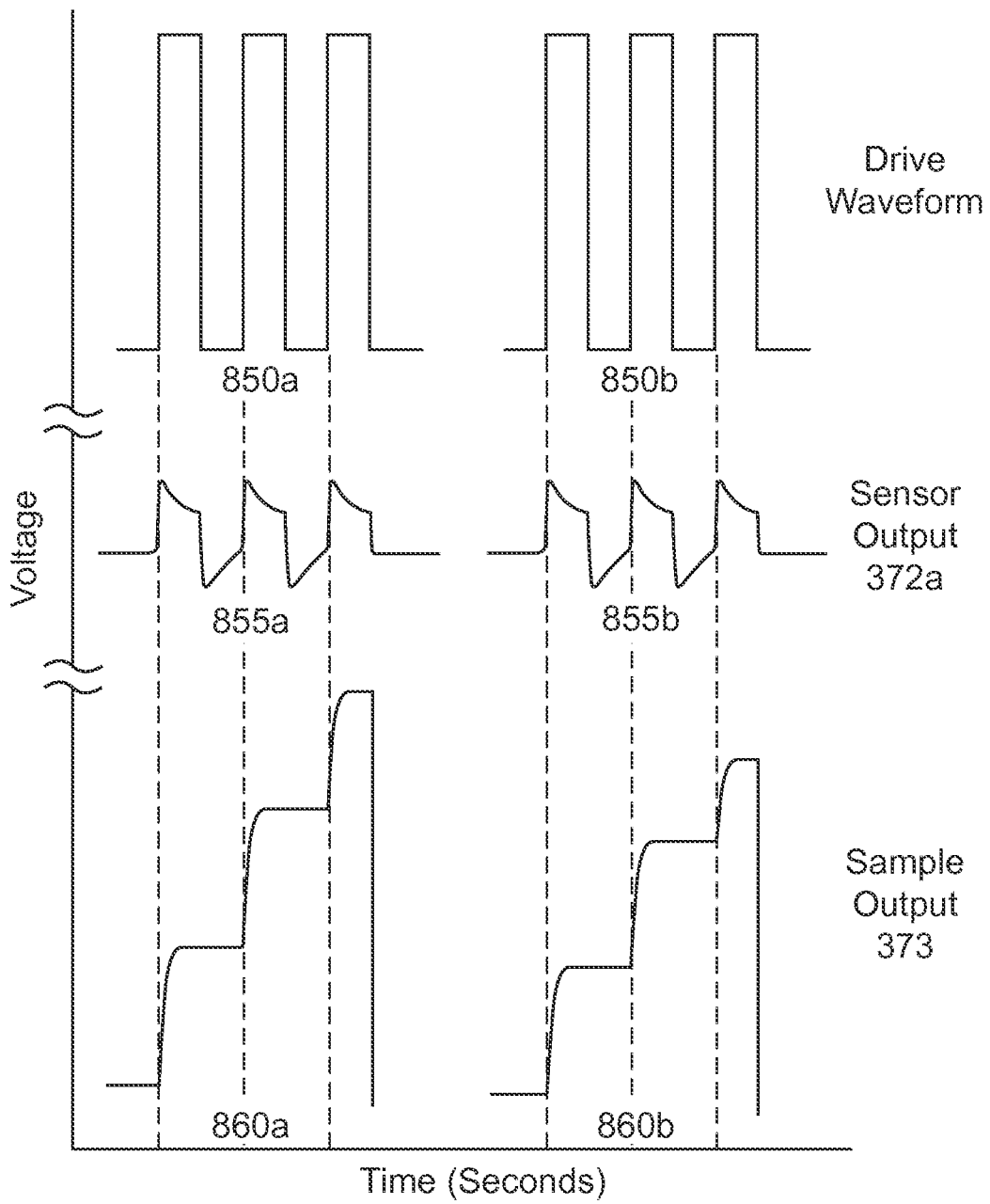
FIG. 4 is a graph of a drive signal and a corresponding (modeled) response signal for the touch device of FIG. 3, wherein the drive signal includes rectangle pulses and the response signal includes impulse pulses; and, FIG. 5 is a schematic view of a touch device that includes a touch panel having a 4×8 matrix of capacitively coupled electrodes, and various circuit components that can be used to detect multiple simultaneous touches on the touch panel.

Turning now to FIG. 4, we see there a voltage vs. time graph of a particular drive signal and a corresponding response signal generated by a sense unit of the type depicted in FIG. 3, as well as the resultant signal (e.g., measured in volts) accumulating on charge accumulator 326a. For purposes of the model, the electronic characteristics of the drive electrode, receive electrode, and coupling capacitance (including the effect of a touch thereon, i.e., decreasing the capacitance from 2.0 pf to 1.5 pf) were assumed to be as described above in connection with the representative embodiment of FIG. 3. Drive signals 850a and 850b are depicted as a square wave, containing a series of three rectangular pulses, after which a measurement is taken on charge accumulator 326a, then the charge accumulator circuit is reset. For device 370, a measurement cycle in the embodiment shown here consists of three rectangular pulses successively applied to each driven electrode. Response signal 855a is the (modeled) differentiated response at point 379 in the absence of a touch, and response signal 855b is the same but in the presence of a touch. Sample output 860a and 860b show the (modeled) resultant three iteration step charging of the capacitor C1 in charge accumulator 326a, in no touch and touch states respectively. As can be seen, response signal 855b results in a smaller charge accumulating on capacitor C1 in the presence of a touch.

Wave forms other than square wave may be used as the drive signal. For example, a ramp input would provide a step function at 855a and 855b. The step voltage would be maintained at a constant as long as the ramp input was available. The current amplifier stage could in such an embodiment be eliminated, and the output voltage could be measured directly by the ADC. The input amplifier gain, in such an embodiment, would be adjusted commensurate with the model range for the ADC. If the ramp time for the signal were short, a sample and hold circuit could be added to hold the voltage until all the receive lines were sampled. The ramp drive signal may be more susceptible to noise, but potentially fewer pulses would be required (possibly one pulse).

Another example of a non-square wave drive signal is a sinusoidal wave form. Such a circuit would generate receive signals similar to that of the square wave, except the peak of the sinusoidal wave would occur in the middle of the sine wave cycle, and be softer, making it potentially susceptible to noise. Three sine waves per measurement cycle would allow the charge to accumulate on the charge accumulator.

Figure 5:
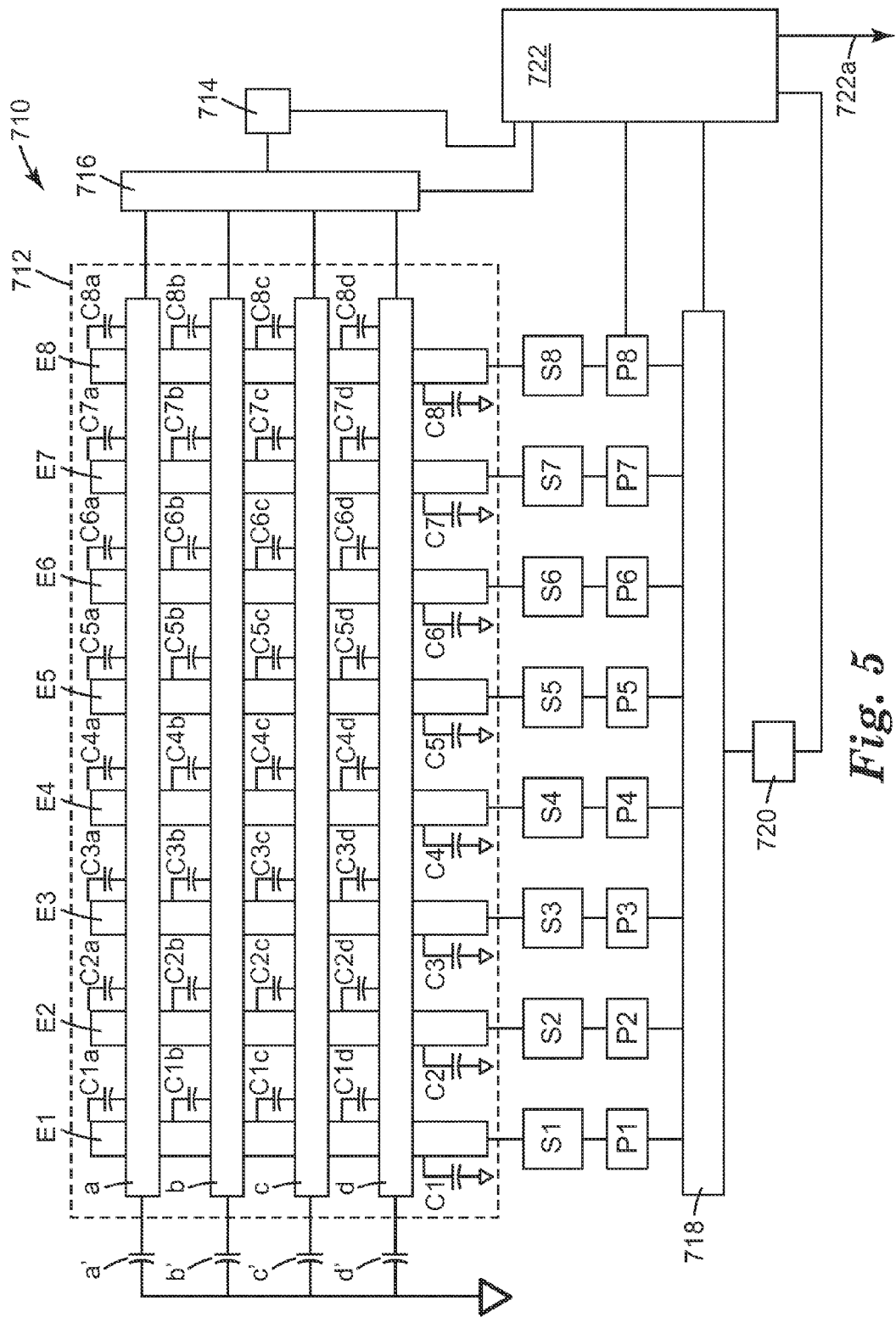

FIG. 5 is a schematic view of a touch device 710 that includes a touch panel 712 having a 4×8 matrix of capacitively coupled electrodes, and various circuit components that can be used to detect multiple simultaneous touches on the touch panel. The electrode matrix includes a top electrode array comprising parallel drive electrodes a, b, c, and d. Also included is a lower array comprising parallel receive electrodes E1, E2, E3, E4, E5, E6, E7, and E8. The top electrode array and the lower electrode array are arranged to be orthogonal to one another. The capacitive coupling between each pair of orthogonal electrodes, referred to above for a given node as the coupling capacitance $C_c$, is labeled for the various nodes of the matrix as C1$a$, C2$a$, C3$a$, C4$a$, C1$b$, C2$b$, and C3$b$, etc., through C8$d$ as shown, the values of which may all be approximately equal in an untouched state but which decrease when a touch is applied as described previously. Also depicted in the figure is the capacitances between the various receive electrodes and ground (C1-C8) and between the various drive electrodes and ground (a' through d').

The 32 nodes of this matrix, i.e., the mutual capacitances or coupling capacitances associated therewith, are monitored by circuitry as described with respect to FIG. 3$a$: drive unit 714; multiplexer 716; sense units S1-S8; charge accumulators P1-P8, which may also function as sample/hold buffers; multiplexer 718; as well as ADC 720; and controller 722, all connected as shown with suitable conductive traces or wires (except that connections between controller 722 and each of charge accumulators P1-P7 are omitted from the drawing for ease of illustration).

In operation, controller 722 causes drive unit 714 to generate a drive signal comprising one or more drive pulses, which are delivered to drive electrode a by operation of multiplexer 716. The drive signal couples to each of receive electrodes E1-E8 via their respective mutual capacitances with drive electrode a. The coupled signal causes the sense units S1-S8 to simultaneously, or substantially simultaneously, generate response signals for each of the receive electrodes. Thus, at this point in time in the operation of device 710, the drive signal being delivered to drive electrode a (which may include, for example, a maximum of 5, 4, 3, or 2 drive pulses, or may have only one drive pulse) is causing sense unit S1 to generate a response signal whose amplitude is indicative of coupling capacitance C1$a$ for the node E1/$a$, and sense unit S2 to generate a response signal whose amplitude is indicative of coupling capacitance C2$a$ for the node E2/$a$, etc., and so on for the other sense units S3-S8 corresponding to nodes E3/$a$ through E8/$a$, all at the same time. If the response signals are of a highly transient nature, then charge accumulators P1-P8 may be provided to accumulate the charge associated with the respective response signals provided by sense units S1-S8, and optionally to sample and hold those charges at the outputs thereof which are provided to the multiplexer 718. Alternatively, if the response signals have a significant steady-state characteristic, e.g. if they are in the form of one or more ramp pulses as with signals described above, then the charge accumulators may be replaced with low-pass filters and/or peak detectors, or the charge accumulators may simply be omitted so that the outputs of the sense units feed directly into the multiplexer 718. In either case, while the characteristic amplitude signals are being delivered to the multiplexer 718, the controller 722 rapidly cycles the multiplexer 718 so that the ADC 720 first couples to charge accumulator P1 (if present, or to a low-pass filter, or to S1, for example) to measure the characteristic amplitude associated with node E1/$a$, then couples to charge accumulator P2 to measure the characteristic amplitude associated with node E2/$a$, and so forth, lastly coupling to charge accumulator P8 to measure the characteristic amplitude associated with node E8/$a$. As these characteristic amplitudes are measured, the values are stored in the controller 722. If the charge accumulators include sample/hold buffers, the controller resets them after the measurements are made.

In the next phase of operation, the controller 722 cycles the multiplexer 714 to couple the drive unit 714 to drive electrode b, and causes the drive unit to generate another drive signal that again comprises one or more drive pulses, now delivered to electrode b. The drive signal delivered to electrode b may be the same or different from that delivered previously to electrode a. For example, for reasons relating to touch panel losses explained above, the drive signal delivered to electrode b may have a smaller amplitude than that delivered to electrode a, due to electrode b's closer proximity to the ends of sense electrodes E1-E8 from which the response signals are derived (and thus lower losses). In any case, the drive signal delivered to electrode b causes sense unit S1 to generate a response signal whose amplitude is indicative of coupling capacitance C1$b$ for the node E1/$b$, and sense unit S2 to generate a response signal whose amplitude is indicative of coupling capacitance C2$b$ for the node E2/$b$, etc., and so on for the other sense units S3-S8 corresponding to nodes E3/$b$ through E8/$b$, all at the same time. The presence or absence of charge accumulators P1-P8, or of sample/hold buffers, or of low-pass filters discussed above in connection with the first phase of operation is equally applicable here. In any case, while the characteristic amplitude signals (e.g. accumulated charge or average amplitude of the response signals) are being delivered to the multiplexer 718, the controller 722 rapidly cycles the multiplexer 718 so that the ADC 720 first couples to charge accumulator P1 (if present, or to a low-pass filter, or to S1, for example) to measure the characteristic amplitude associated with node E1/$b$, then couples to charge accumulator P2 to measure the characteristic amplitude associated with node E2/$b$, and so forth, lastly coupling to charge accumulator P8 to measure the characteristic amplitude associated with node E8/$b$. As these characteristic amplitudes are measured, the values are stored in the controller 722. If the peak detectors include sample/hold buffers, the controller resets them after the measurements are made.

Two more phases of operation then follow in similar fashion, wherein a drive signal is delivered to electrode c and the characteristic amplitudes associated with nodes E1/$c$ through E8/$c$, are measured and stored, and then a drive signal is delivered to electrode d and the characteristic amplitudes associated with nodes E1/$d$ through E8/$d$, are measured and stored.

At this point, characteristic amplitudes of all of the nodes of the touch matrix have been measured and stored within a very short timeframe, e.g., in some cases less than 20 msec or less than 10 msec, for example. The controller 722 may then compare these amplitudes with reference amplitudes for each of the nodes to obtain comparison values (e.g., difference values) for each node. If the reference amplitudes are representative of a non-touch condition, then a difference value of zero for a given node is indicative of "no touch" occurring at such node. On the other hand, a significant difference value is representative of a touch threshold (which may include a partial touch) at the node. The controller 722 may employ interpolation techniques in the event that neighboring nodes exhibit significant difference values, as mentioned above.

Unless otherwise indicated, all numbers expressing quantities, measurement of properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

Various modifications and alterations of this invention will be apparent to those skilled in the art without departing from the spirit and scope of this invention, and it should be understood that this invention is not limited to the illustrative embodiments set forth herein. For example, the reader should assume that features of one disclosed embodiment can also be applied to all other disclosed embodiments unless otherwise indicated. It should also be understood that all U.S. patents, patent application publications, and other patent and non-patent documents referred to herein are incorporated by reference, to the extent they do not contradict the foregoing disclosure.

The invention claimed is:

1. A touch-sensitive apparatus, comprising:
    a panel comprising a touch surface and a plurality of electrodes defining an electrode matrix, the plurality of electrodes comprising a plurality of drive electrodes and a plurality of receive electrodes, each drive electrode being capacitively coupled to each receive electrode at a respective node of the matrix, the panel being configured such that a touch on the touch surface proximate a given one of the nodes changes a coupling capacitance between the drive electrode and the receive electrode associated with the given node;
    a drive unit configured to generate drive signals and to deliver the drive signals to the drive electrodes;
    a sense unit including an open-loop transistor-based amplifier and configured to generate, in response to the drive signals, response signals for the plurality of receive electrodes, an amplitude of each of the response signals being responsive to the coupling capacitance at the associated node;
    a charge accumulator adapted to provide an accumulated signal for each node based on a corresponding response signal generated by the sense unit; and
    a measurement unit configured to measure the accumulated signals from the charge accumulator and to determine therefrom the positions of multiple temporally overlapping touches, if present, on the touch surface.

2. The apparatus of claim 1, wherein the transistor-based amplifier is unipolar.

3. The apparatus of claim 1, wherein the transistor-based amplifier comprises a first and second transistor.

4. The apparatus of claim 3, wherein the transistor-based amplifier includes no transistors other than the first and second transistors.

5. The apparatus of claim 3, wherein a collector of the first transistor couples to a base of the second transistor.

6. The apparatus of claim 3, wherein the charge accumulator is coupled between an emitter of the first transistor and a collector of the second transistor.

7. The apparatus of claim 1, wherein the sense unit further comprises a reference circuit coupled between the drive unit and the transistor-based amplifier.

8. The apparatus of claim 7, wherein the reference circuit generates the response signals, and the response signals are differentiated representations of the drive signals, the differentiation of each response signal being based on the coupling capacitance of the node associated with the response signal.

9. The apparatus of claim 7, wherein the reference circuit includes a resistance through which the coupling capacitance is discharged.

10. The apparatus of claim 7, wherein the transistor-based amplifier comprises a first and second transistor, and wherein a base of the first transistor couples to the reference circuit, and a collector of the first transistor couples to a base of the second transistor.

11. The apparatus of claim 7, wherein the transistor-based amplifier comprises a first and second transistor, and wherein the reference circuit is adapted to bias a base of the first transistor.

12. The apparatus of claim 7, wherein the reference circuit is unipolar.

13. The apparatus of claim 12, wherein the transistor-based amplifier is also unipolar.

14. The apparatus of claim 1, further comprising a reset circuit configured to reset the charge accumulator.

15. The apparatus of claim 1, wherein the measurement unit converts each accumulated signal into a digital representation.

* * * * *

UNITED STATES PATENT AND TRADEMARK OFFICE
CERTIFICATE OF CORRECTION

PATENT NO. : 8,493,358 B2  Page 1 of 1
APPLICATION NO. : 13/111084
DATED : July 23, 2013
INVENTOR(S) : Thomas J Rebeschi et al.

It is certified that error appears in the above-identified patent and that said Letters Patent is hereby corrected as shown below:

Title Page 2, Item (56) Column 2 (Other Publications)
Line 14, after "Multi-touch" insert -- Touch --

Line 20, delete "Therfor"," and insert -- Therefor" --

Line 22, delete "Therfor"," and insert -- Therefor", --

Signed and Sealed this
Thirty-first Day of December, 2013

Margaret A. Focarino
*Commissioner for Patents of the United States Patent and Trademark Office*